US010656791B2

(12) United States Patent
Joyce et al.

(10) Patent No.: US 10,656,791 B2
(45) Date of Patent: May 19, 2020

(54) METHODS, SYSTEMS, AND MEDIA FOR NAVIGATING A USER INTERFACE WITH A TOOLBAR

(71) Applicant: Google LLC, Mountain View, CA (US)

(72) Inventors: Alan Joyce, Mountain View, CA (US); Marshall Bock, San Francisco, CA (US); Kristofer Chiao, Hillsborough, CA (US); Jason Robert Sao Bento, Toronto (CA); Jonathan Terleski, Mountain View, CA (US)

(73) Assignee: Google LLC, Mountain View, CA (US)

( * ) Notice: Subject to any disclaimer, the term of this patent is extended or adjusted under 35 U.S.C. 154(b) by 661 days.

(21) Appl. No.: 15/177,777

(22) Filed: Jun. 9, 2016

(65) Prior Publication Data

US 2016/0364095 A1    Dec. 15, 2016

Related U.S. Application Data

(60) Provisional application No. 62/174,485, filed on Jun. 11, 2015.

(51) Int. Cl.
*G06F 3/0482*    (2013.01)
*G06F 9/451*    (2018.01)

(52) U.S. Cl.
CPC ............ *G06F 3/0482* (2013.01); *G06F 9/451* (2018.02)

(58) Field of Classification Search
CPC ..... G06F 3/0482; G06F 3/04812; G06F 9/451
See application file for complete search history.

(56) References Cited

U.S. PATENT DOCUMENTS

| | | | | |
|---|---|---|---|---|
| 5,880,729 A | * | 3/1999 | Johnston, Jr. ........... | G06F 9/451 715/823 |
| 2003/0052919 A1 | * | 3/2003 | Tlaskal ................... | G06F 9/451 715/764 |
| 2004/0221243 A1 | * | 11/2004 | Twerdahl ................ | G06F 3/016 715/834 |

(Continued)

*Primary Examiner* — Jennifer N To
*Assistant Examiner* — Amy P Hoang
(74) *Attorney, Agent, or Firm* — Byrne Poh LLP

(57) ABSTRACT

Methods, systems, and media for navigating a user interface with a toolbar are provided. In some embodiments, the method comprises: causing a toolbar containing selectable options to be presented concurrently with media content items, wherein each of the selectable options corresponds to a category of media content and is associated with a textual item and a graphical item that relate to the category of media content being presented with that selectable option; determining that a first selectable option from the selectable options has been selected; modifying the toolbar by causing a first animation to be displayed that replaces the textual item with the graphical item associated with the first selectable option, wherein each of the remaining selectable options continue to be represented with the corresponding textual item; determining that a second selectable option from the selectable options has been selected; and modifying the toolbar by causing a second animation to be displayed that replaces the textual item with the graphical item associated with the second selectable option and a third animation to be displayed that replaces the graphical item with the textual item associated with the first selectable option.

17 Claims, 6 Drawing Sheets

(56) References Cited

U.S. PATENT DOCUMENTS

| | | | | |
|---|---|---|---|---|
| 2005/0160458 A1* | 7/2005 | Baumgartner | ......... | H04H 60/46 |
| | | | | 725/46 |
| 2011/0099519 A1* | 4/2011 | Ma | ......... | G06F 3/0482 |
| | | | | 715/811 |
| 2012/0221974 A1* | 8/2012 | Trotta | ......... | G06F 3/0485 |
| | | | | 715/823 |
| 2014/0082554 A1* | 3/2014 | Iwaniszczuk | ......... | G06F 3/0483 |
| | | | | 715/823 |

* cited by examiner

METHODS, SYSTEMS, AND MEDIA FOR NAVIGATING A USER INTERFACE WITH A TOOLBAR

CROSS-REFERENCE TO RELATED APPLICATIONS

This application claims the benefit of U.S. Provisional Patent Application No. 62/174,485, filed Jun. 11, 2015, which is hereby incorporated by reference herein in its entirety.

TECHNICAL FIELD

The disclosed subject matter relates to methods, systems, and media for navigating a user interface with a toolbar. More particularly, the disclosed subject matter relates to providing media guidance with a toolbar, where one or more selectable options on the toolbar can be modified to show textual identifying information or graphical identifying information.

BACKGROUND

A navigational toolbar is a portion of a graphical user interface that assists users in accessing information. Such toolbars generally include multiple links or tabs to particular types of information. For example, a toolbar that is part of a web browsing application can include tabs directing the user to particular types of web content or tabs directing the user to particular browsing features. Each of these tabs is identified by a text label that fills up the width of the tab. While the user may easily be able to see what each tab represents with the text label, each tab takes up a substantial amount of space. The user may deem this to be unnecessary, for example, with the currently selected tab as the user has already selected this tab and understands the content received in response to selecting the tab without requiring a text label. Such toolbars with tabs identified by text labels may also be cumbersome for graphical user interfaces being displayed on mobile device screens and, more particularly, small mobile device screens.

Accordingly, it is desirable to provide new methods, systems, and media for navigating a user interface with a toolbar.

SUMMARY

In accordance with various embodiments of the disclosed subject matter, methods, systems, and media for navigating a user interface with a toolbar are provided.

In accordance with some embodiments of the disclosed subject matter, a method for media guidance is provided, the method comprising: causing a toolbar containing a plurality of selectable options to be presented concurrently with media content items, wherein each of the plurality of selectable options corresponds to a category of media content, wherein each of the plurality of selectable options is associated with a textual item and a graphical item that relate to the category of media content being presented with that selectable option, and wherein each of the plurality of selectable options is currently presented with the textual item; determining that a first selectable option from the plurality of selectable options has been selected; modifying the toolbar by causing a first animation to be displayed that replaces the textual item associated with the first selectable option with the graphical item associated with the first selectable option, wherein each of the remaining selectable options of the plurality of selectable options continue to be represented with the corresponding textual item; determining that a second selectable option from the plurality of selectable options has been selected; and modifying the toolbar by causing a second animation to be displayed that replaces the textual item associated with the second selectable option with the graphical item associated with the second selectable option and a third animation to be displayed that replaces the graphical item associated with the first selectable option with the textual item associated with the first selectable option.

In some embodiments, the method further comprises: determining whether to include a selectable option in the toolbar based on availability of the media content items in the category of media content; and, in response to determining that the selectable option should be included in the toolbar, retrieving the textual item and the graphic item associated with the selectable option prior to presenting the toolbar.

In some embodiments, the method further comprises: receiving user preferences relating to the toolbar; and selecting, without user intervention, a selectable option in the toolbar based on the user preferences, wherein the toolbar is modified in response to the selection.

In some embodiments, the method further comprises: receiving user preferences relating to the toolbar; and inhibiting a selectable option in the toolbar from being presented based on the user preferences.

In some embodiments, the second animation shows the textual item associated with the second selectable option transforming into the graphical item associated with the second selectable option, and the third animation shows the graphical item associated with the first selectable option transforming into the textual item associated with the first selectable option, where the second animation and the third animation are presented concurrently.

In some embodiments, the first selectable option that is identified by the textual item is a first size in the toolbar and wherein the first animation of the first selectable option includes reducing the first selectable option from a first size to a second size that accommodates the graphical item.

In some embodiments, in response to determining that the second selectable option has been reduced, the third animation of the first selectable option includes returning the first selectable from the second size to the first size.

In some embodiments, the method further comprises causing a navigation cursor to be presented for navigating the toolbar, where, in response to determining that the navigation cursor is navigating away from the first selectable option, the second animation shows the textual item associated with the second selectable option transforming into the graphical item associated with the second selectable option and the third animation shows the graphical item associated with the first selectable option transforming into the textual item associated with the first selectable option.

In accordance with some embodiments of the disclosed subject matter, a system for media guidance is provided, the system comprising: a hardware processor that is configured to: cause a toolbar containing a plurality of selectable options to be presented concurrently with media content items, wherein each of the plurality of selectable options corresponds to a category of media content, wherein each of the plurality of selectable options is associated with a textual item and a graphical item that relate to the category of media content being presented with that selectable option, and wherein each of the plurality of selectable options is currently presented with the textual item; determine that a first selectable option from the plurality of selectable options has been selected; modify the toolbar by causing a first animation to be displayed that replaces the textual item associated with the first selectable option with the graphical item associated with the first selectable option, wherein each of the remaining selectable options of the plurality of selectable options continue to be represented with the corresponding textual item; determine that a second selectable option from the plurality of selectable options has been selected; and modify the toolbar by causing a second animation to be displayed that replaces the textual item associated with the second selectable option with the graphical item associated with the second selectable option and a third animation to be displayed that replaces the graphical item associated with the first selectable option with the textual item associated with the first selectable option.

In accordance with some embodiments of the disclosed subject matter, a non-transitory computer-readable medium containing computer-executable instructions that, when executed by a processor, cause the processor to perform a method for media guidance, the method comprising: causing a toolbar containing a plurality of selectable options to be presented concurrently with media content items, wherein each of the plurality of selectable options corresponds to a category of media content, wherein each of the plurality of selectable options is associated with a textual item and a graphical item that relate to the category of media content being presented with that selectable option, and wherein each of the plurality of selectable options is currently presented with the textual item; determining that a first selectable option from the plurality of selectable options has been selected; modifying the toolbar by causing a first animation to be displayed that replaces the textual item associated with the first selectable option with the graphical item associated with the first selectable option, wherein each of the remaining selectable options of the plurality of selectable options continue to be represented with the corresponding textual item; determining that a second selectable option from the plurality of selectable options has been selected; and modifying the toolbar by causing a second animation to be displayed that replaces the textual item associated with the second selectable option with the graphical item associated with the second selectable option and a third animation to be displayed that replaces the graphical item associated with the first selectable option with the textual item associated with the first selectable option.

In accordance with some embodiments of the disclosed subject matter, a system for media guidance is provided, the system comprising: a means for presenting a toolbar containing a plurality of selectable options concurrently with media content items, wherein each of the plurality of selectable options corresponds to a category of media content, wherein each of the plurality of selectable options is associated with a textual item and a graphical item that relate to the category of media content being presented with that selectable option, and wherein each of the plurality of selectable options is currently presented with the textual item; means for determining that a first selectable option from the plurality of selectable options has been selected; means for modifying the toolbar by causing a first animation to be displayed that replaces the textual item associated with the first selectable option with the graphical item associated with the first selectable option, wherein each of the remaining selectable options of the plurality of selectable options continue to be represented with the corresponding textual item; means for determining that a second selectable option from the plurality of selectable options has been selected; and means for modifying the toolbar by causing a second animation to be displayed that replaces the textual item associated with the second selectable option with the graphical item associated with the second selectable option and a third animation to be displayed that replaces the graphical item associated with the first selectable option with the textual item associated with the first selectable option.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
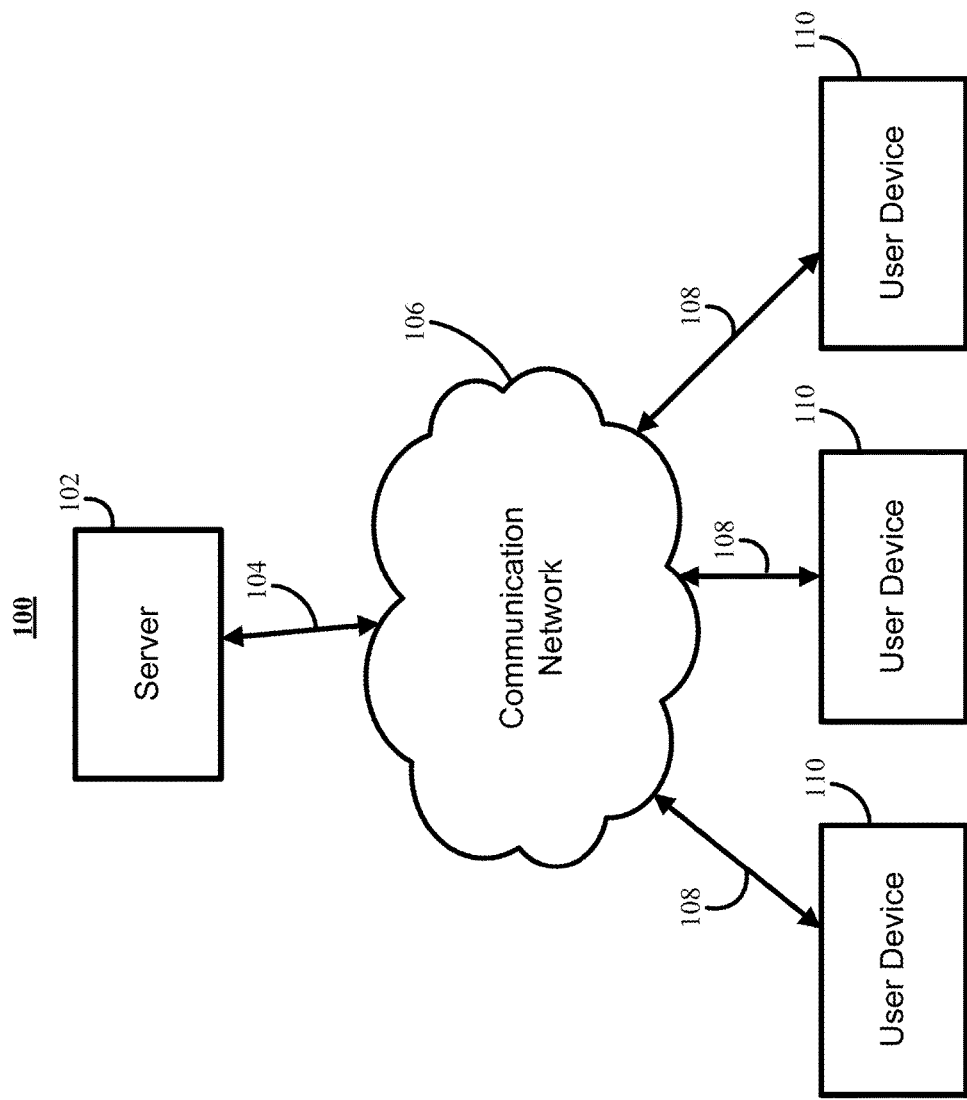
FIG. 1 shows a schematic diagram of an illustrative example of a system for media guidance in accordance with some embodiments of the disclosed subject matter.

Methods, systems, and media for navigating a user interface with a toolbar are provided.

In accordance with some embodiments, media interfaces representing media content items can be presented in a user interface, thereby allowing a user to browse and/or navigate through multiple media interfaces to select a media content item to consume. These media interfaces can be presented, for example, in a grid of media interfaces, as a column of media interfaces, as a row of media interfaces, as multiple rows of media interfaces with each row representing a group of related media interfaces, and/or using any other suitable technique or techniques.

In some embodiments, a navigation toolbar can be presented as part of the user interface. For example, in response to launching an application for consuming game-related content, a navigation toolbar can be presented, where the navigation toolbar includes multiple selectable options or tabs. These selectable options can be provided to allow a user to navigate through different categories of media content items. It should be noted that each of the selectable options in the navigation toolbar can be identified by a textual item (e.g., a text label that describes the media content items provided in response to selecting the selectable option) or a graphical item (e.g., an icon or any other suitable representation that describes the media content items provided in response to selecting the selectable option).

It should also be noted that, prior to presenting the navigation toolbar, information relating to the toolbar and the selectable options in the toolbar can be retrieved. Such information can include, for example, a textual item associated with a selectable option, a graphical item associated with a selectable option, a number of selectable options that are available for presentation with the toolbar, an indication of whether media content items are available or present in connection with a particular selectable option (e.g., an indication that there are no media content items for the "Livestreamed Gaming Videos" tab), rendering information (e.g., width of a selectable option having a textual item, width of a selectable option having a graphical item, etc.), etc.

In some embodiments, in response to determining that a first selectable option has been selected, the navigation toolbar can be modified. For example, this can include displaying a first animation that replaces the textual item associated with the first selectable option with the graphical item associated with the first selectable option, while the remaining selectable options continue to be represented with their corresponding textual item. In a more particular example, this can include an animation that transforms the textual item into the graphical item, an animation that slides the textual item out of the selectable option and slides the graphical item into the selectable option, an animation that causes the textual item to fade out while the graphical item fades in an area provided by the selectable option, or animation that performs any other suitable technique.

In some embodiments, in response to determining that a second selectable option has been selected, the navigation toolbar can be further modified. Continuing with the above-mentioned example, this can include displaying a second animation that replaces the textual item associated with the second selectable option with the graphical item associated with the second selectable option and a third animation that replaces the graphical item associated with the first selectable option with the textual item associated with the first selectable option. It should be noted that, in some embodiments, in response to determining that the second selectable option has been selected (e.g., receiving a user selection, detecting a navigation cursor away from the first selectable option to the second selectable option, etc.), the second animation and the third animation can be presented concurrently.

In some embodiments, the selection of a media interface by the user can cause the presentation of the associated media content item. For example, in response to receiving one or more directional inputs (e.g., issued by a user input device) to select a selectable option in the toolbar and in response to receiving a user selection of a particular media interface, the corresponding media content item can be presented to the user.

It should be noted that, in some embodiments, a media interface presented in response to selecting a selectable option on the navigation toolbar can represent a single media content item and/or a collection of media content items (e.g., a playlist of videos, a playlist of songs, a collection of images, etc.). In some embodiments, a selection of media interfaces presented in a user interface can include a combination of one or more media interfaces each representing single media content items and one or more media interfaces each representing a collection of media content items. For example, in response to concurrently presenting a media interface along with media content identified by the media interface, the user can be provided with an opportunity to navigate through media interfaces that represent other single media content items and/or media interfaces that represent a collection of media content items.

It should also be noted that media content items can be any suitable media content. For example, media content can include audio and/or video media content. As another example, media content can include print media content or image media content. As still another example, media content can include a collection of media content, such as a playlist of videos, a playlist of songs, a collection of images, etc. As a further example, media content can include subscription based media content, such as podcasts, online magazine subscriptions, etc. As another further example, media content can include interactive media content, such as applications and video games. As another further example, media content can include any suitable combination thereof and/or any other suitable media content.

Although the embodiments described herein generally relate to the presentation of gaming-related media content, this is merely illustrative. The mechanisms described herein can be used in connection with providing a toolbar for navigating through any suitable content.

FIG. 1 shows an example 100 of a generalized schematic diagram of a system on which the mechanisms for navigating a user interface including content relevant to a particular video game with a toolbar as described herein can be implemented in accordance with some embodiments. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for navigating a user interface including content relevant to a particular video game with a toolbar, such as a hardware processor, a computer, a data processing device, or any suitable combination of such devices. For example, the mechanisms for navigating a user interface including content relevant to a particular video game with a toolbar can be distributed into multiple backend components and multiple frontend components and/or user interfaces. In a more particular example, backend components, such as: mechanisms for providing an indication that a video relevant to one or more categories, keywords, video games, and/or selectable options on a toolbar is present; mechanisms for associating one or more textual items and one or more graphical items with a selectable option on a toolbar; mechanisms for selecting videos to be presented by a user interface associated with a particular video game; mechanisms for receiving requests for media content; mechanisms for generating a toolbar having selectable options; mechanisms for modifying the toolbar with one or more animations; etc., can be performed on one or more servers 102. In another particular example, frontend components, such as presentation of a user interface that includes a toolbar having selectable options, initiating requests for a user interface associated with a particular video game, initiating requests for media content, presentation of the transformation or modification of a selectable option etc., can be performed on one or more user devices 110.

In some embodiments, each of user devices 110 and server 102 can be any of a general purpose device such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 110 can be implemented as a smartphone, a tablet computer, a mobile telephone, a wearable computer, a personal computer, a laptop computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110, and servers 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for navigating a user interface including content relevant to a particular video game with a toolbar. For example, system 100 can include a media content discovery server 102 that facilitates discovery of media content available from a media content platform using the mechanisms described herein, a media content delivery server 102 that responds to requests for the media content by causing the video content to be presented to a user, a user interface generation server 102 that creates instructions for presenting a user interface associated with a particular video game, and/or any other suitable servers for performing any suitable functions of the mechanisms described herein.

Figure 2:
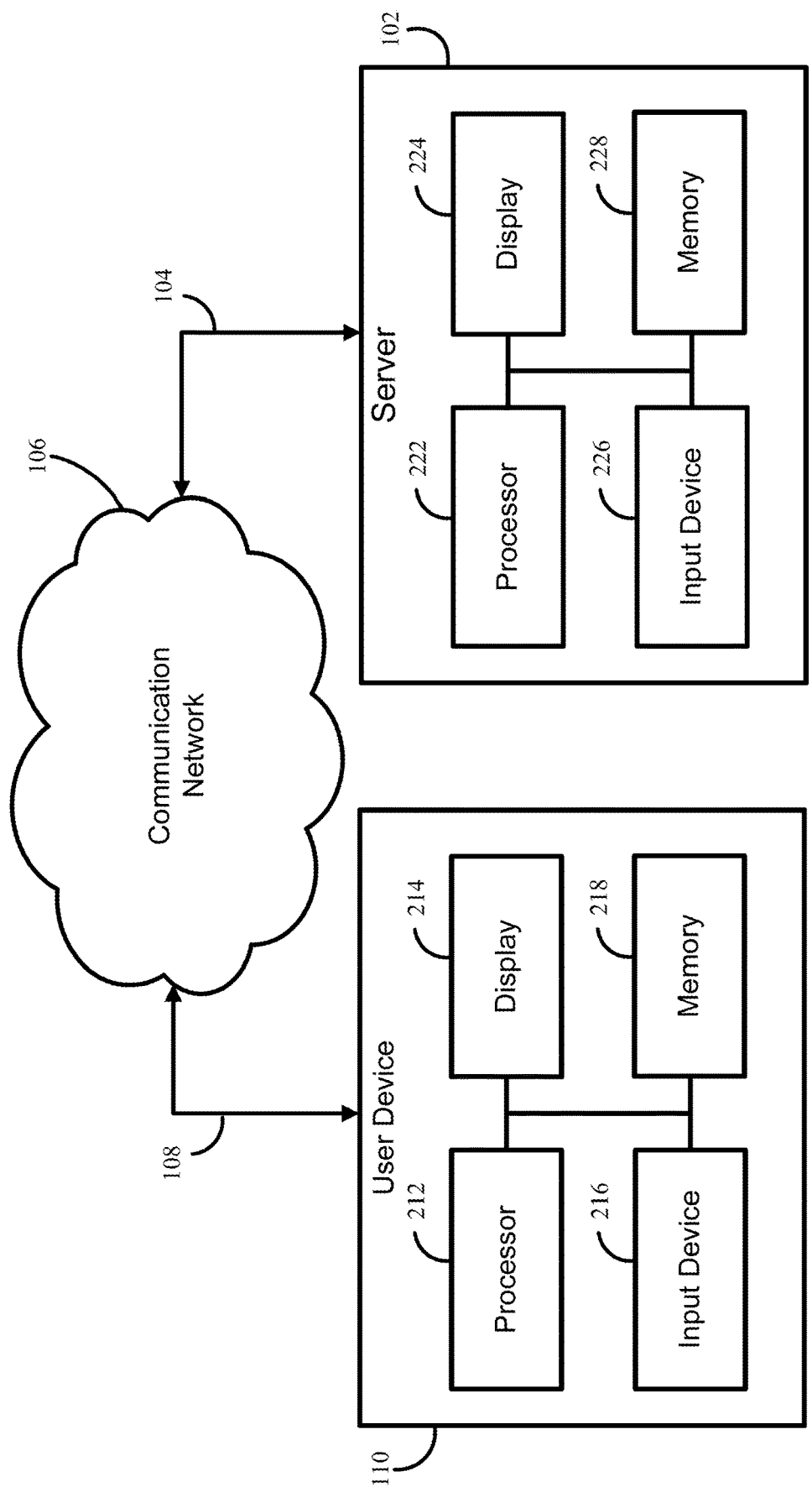
FIG. 2 shows an illustrative example of hardware that can be used in a server and/or a user device in accordance with some embodiments of the disclosed subject matter.

FIG. 2 illustrates an example 200 of hardware that can be used to implement one or more of user devices 110 and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for initiating requests for a user interface associated with a particular video game that includes a navigation toolbar having selectable options or tabs, presenting the user interface, initiating requests for media content via the user interface, and/or to perform any other suitable functions in accordance with instructions received as a result of, for example, process 300 described above in connection with FIG. 3, and/or to send and receive data through communications link 108. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device for storing data received through communications link 104 or through other links. The storage device can further include a server program for controlling hardware processor 222. In some embodiments, memory 228 can include information stored as a result of user activity (e.g., metadata input by a user, sharing of content by users, requests for content associated with users, etc.), and hardware processor 222 can receive requests to present a user interface associated with a particular video game from user devices 110. In some embodiments, the server program can cause hardware processor 222 to, for example, execute process 300 as described below in connection with FIG. 3.

Hardware processor 222 can use the server program to communicate with user devices 110 as well as provide access to and/or copies of the mechanisms described herein. It should also be noted that data received through communications link 104 or any other communications links can be received from any suitable source. In some embodiments, hardware processor 222 can send and receive data through communications link 104 or any other communication links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for aggregating and presenting content relevant to a particular video game. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
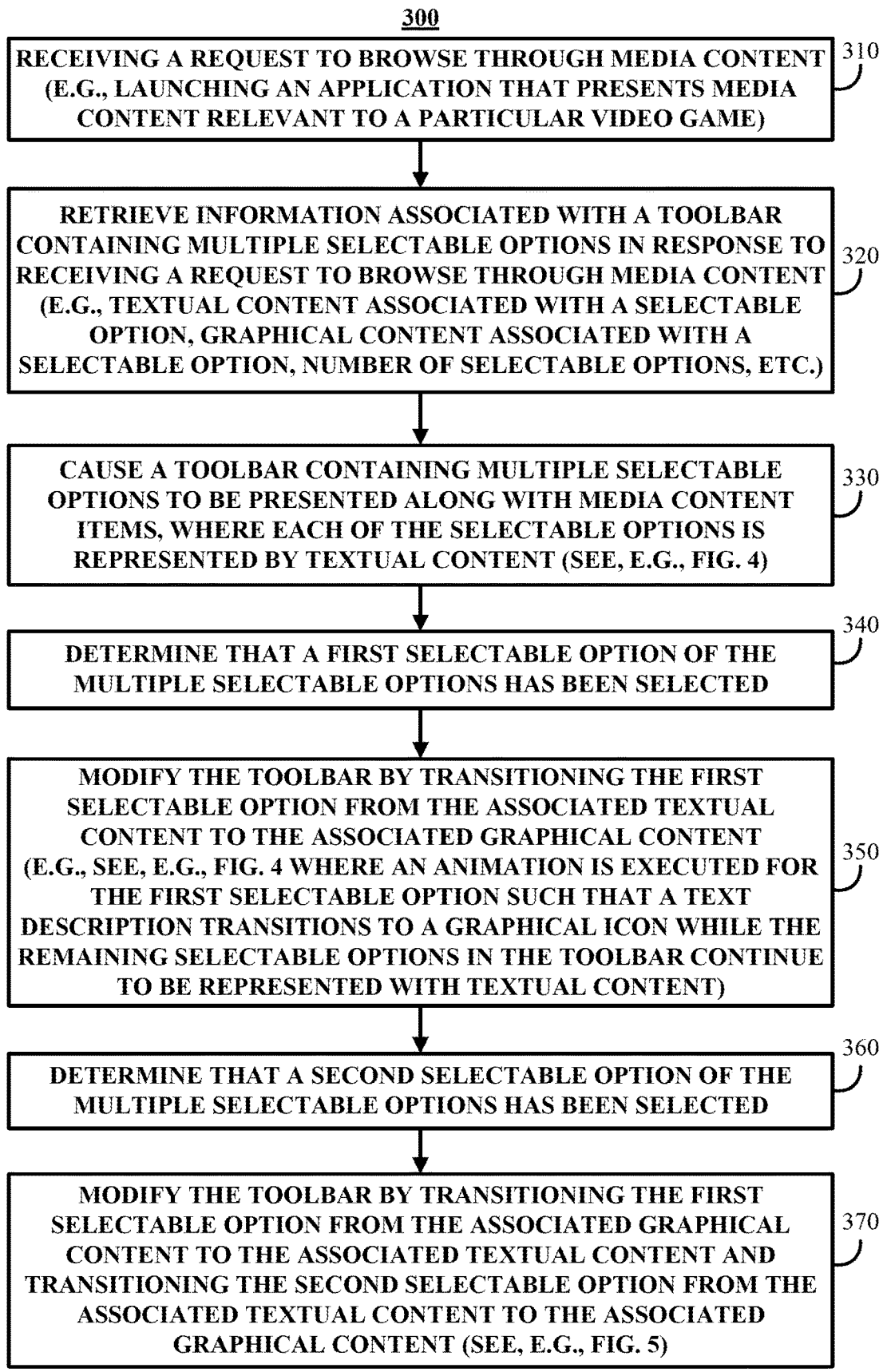
FIG. 3 shows an illustrative example of a process for navigating a user interface with a toolbar having selectable options that transition between textual identifying information and graphical identifying information in accordance with some embodiments of the disclosed subject matter.

Turning to FIG. 3, an example 300 of a process for displaying media interfaces concurrently with a toolbar having selectable options and modifying the toolbar based on determining that a selectable option on the toolbar has been selected is illustrated in accordance with some embodiments.

Process 300 can begin by receiving a request to browse through media content items at 310. The request can be received from any suitable source. For example, in some embodiments, a request can be generated by a hardware processor determining that a particular web page has been loaded. As another example, in some embodiments, a request can be generated by a hardware processor determining that a user has entered a search query; the request can therefore indicate that media content items which satisfy the parameters of the search query should be presented. In yet another example, in some embodiments, a request can be generated by a hardware processor determining that a particular application has been launched on a user device. Such an application can, for example, present media content relevant to a particular video game (e.g., user-generated video content, livestreamed video content, official video content from the game developers, video reviews, and other video content relevant to "Game X" by Game Developer Y).

In some embodiments, process 300 can retrieve information associated with a toolbar containing multiple selectable options in response to receiving the request to browse through media content at 320. Such information can include, for example, a textual item associated with a selectable option, a graphical item associated with a selectable option, a number of selectable options that are available for presentation with the toolbar, an indication of whether media content items are available or present in connection with a particular selectable option (e.g., an indication that there are no media content items for the "Livestreamed Gaming Videos" tab), rendering information (e.g., width of a selectable option having a textual item, width of a selectable option having a graphical item, etc.), etc. In a more particular example, in response to determining that no media content items are available or present for a particular option, process 300 can inhibit that the selectable option or tab from being presented in the toolbar.

In some embodiments, at 330, process 300 can present a toolbar containing multiple selectable options along with one or more media interfaces in response to receiving the request. The toolbar including one or more selectable options and the one or more media interfaces can be presented in any suitable manner.

Figure 4:
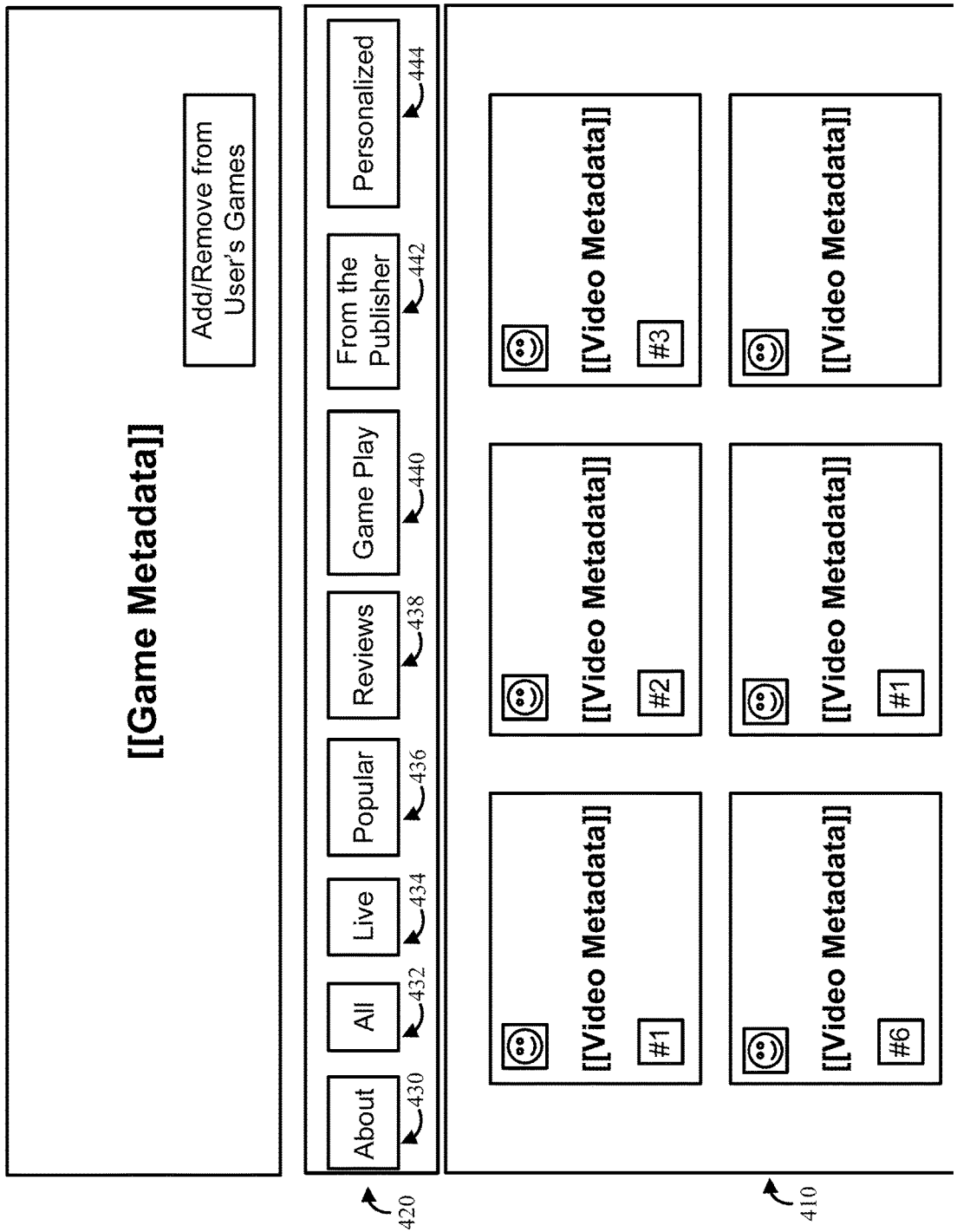
FIG. 4 shows an illustrative example of a user interface for presenting media interfaces along with a toolbar for navigating through media content in accordance with some embodiments of the disclosed subject matter.

For example, in some embodiments, the one or more media interfaces 410 can be presented in a grid of two or more rows, as shown in and described in connection with FIG. 4. As also shown in FIG. 4, a toolbar 420 including one or more user interface components 430-444 (e.g., tabs, buttons, and/or any other suitable type of component) can be positioned above the media interfaces 410 and used to cause additional and/or alternative media interfaces to be presented. For example, in response to selecting a user interface component corresponding to a category or genre of content (e.g., "About," "All," "Live," "Popular," "Reviews," "Game Play," "From the Publisher," "Personalized," etc.), media interfaces corresponding to media content in the selected content category and relevant to a particular video game can be presented. In a more particular example, in response to selecting user interface component 434, which has the text label "Live," media interfaces corresponding to livestreamed media content for that particular video game can be presented. In another more particular example, in response to selecting user interface component 430, which was the text label "About," a single media interface that includes content describing the particular video game and/or describing media content relating to the particular video game can be provided.

Figure 5:
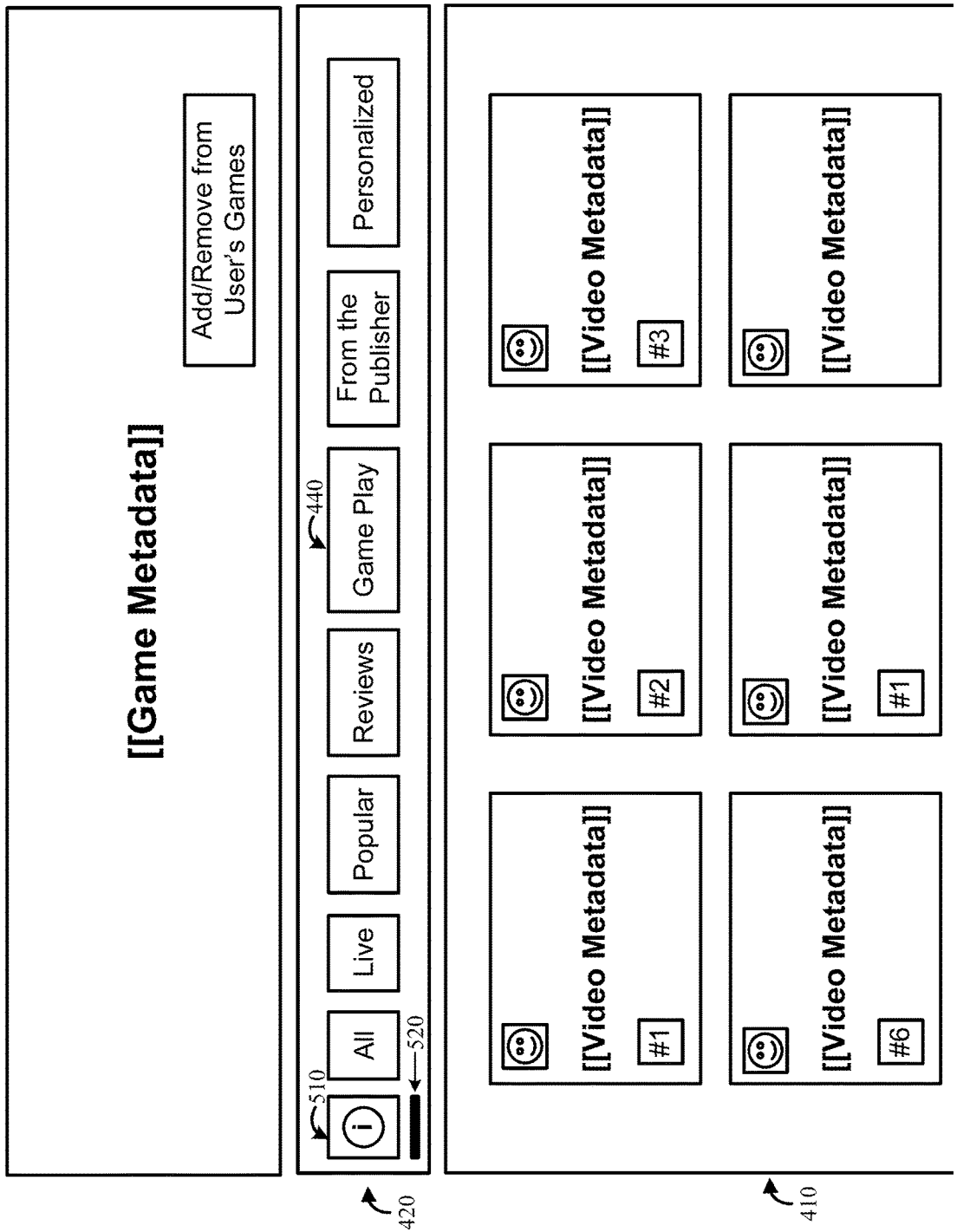
FIG. 5 shows an illustrative example of a user interface for presenting media interfaces along with a toolbar for navigating through media content, where a first selectable option from the toolbar has been selected, in accordance with some embodiments of the disclosed subject matter.
Figure 6:
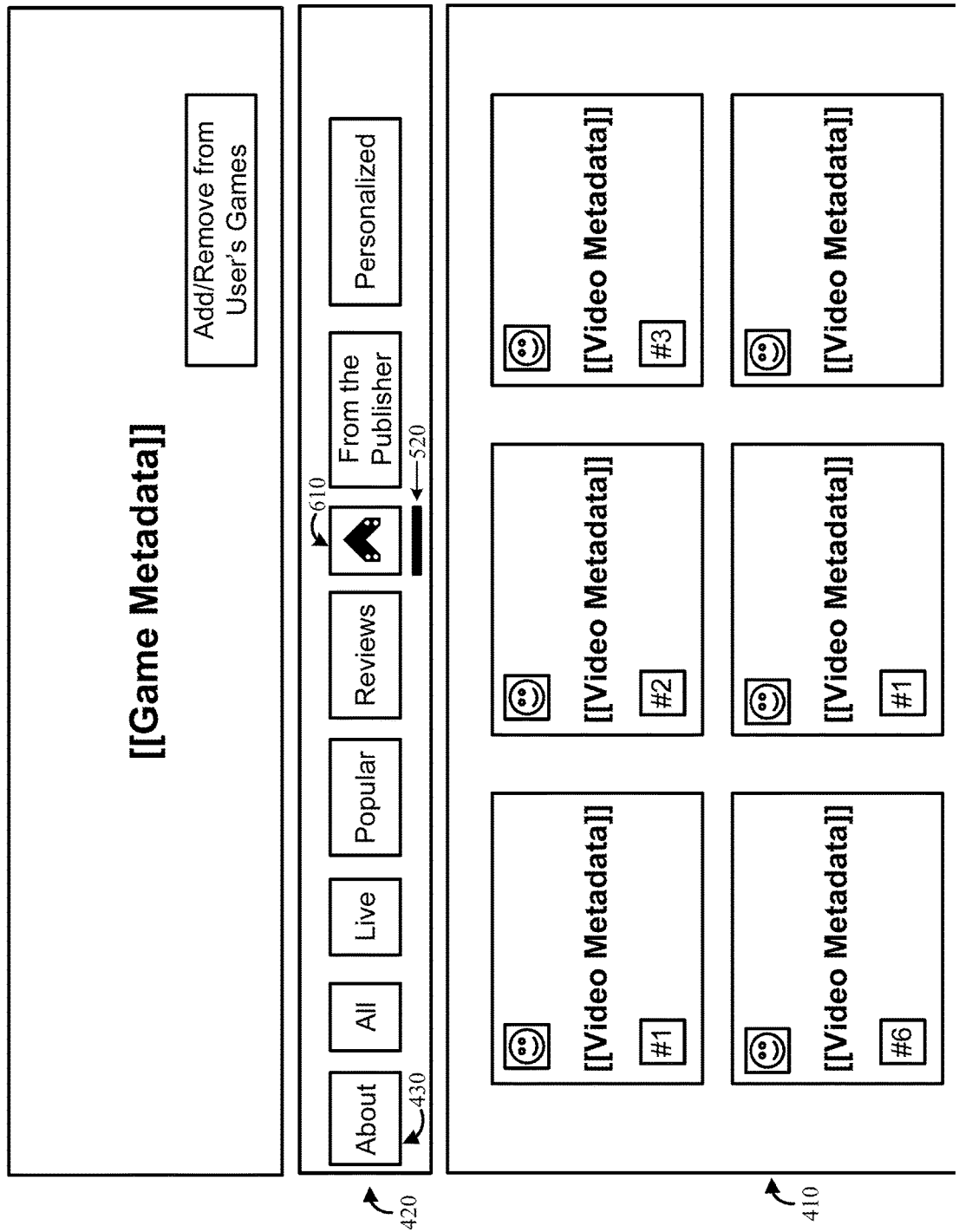
FIG. 6 shows an illustrative example of a user interface for presenting media interfaces along with a toolbar for navigating through media content, where a second selectable option from the toolbar has been selected, in accordance with some embodiments of the disclosed subject matter.

It should be noted that, in some embodiments, each of the selectable options can be represented by a textual item, such as a text label, or a graphical item, such as an icon. For example, selectable option 430 is identified by a textual item ("About") in FIG. 4 and selectable option 430 is identified by a graphical item in FIG. 5. For example, as shown in FIGS. 4-6, textual items can include a block of text. In some embodiments, textual items can include any suitable text along with images, icons, graphics, animations, videos, and/or any other suitable content. The position of the textual item in selectable options 430-444 in toolbar 420 is merely an example, and the textual item can be presented in any suitable position.

In some embodiments, these textual items and graphical items associated with each selectable option can, for example, be designated by the application developer, the video game developer, or the user. For example, graphical items associated with the video game developer or publisher can assist the user in understanding that the media content items being presented correspond to official video content that is endorsed by the video game developer or publisher.

In response to generating navigation toolbar 420 along with media interfaces 410 for display, process 300 can determine whether a selectable option should be represented with its associated textual item or its associated graphical item.

As shown in FIG. 4, in some embodiments, upon requesting to browse through media content relevant to a particular video game, the toolbar can initially use textual items associated with each of the selectable options in navigation toolbar 410. This can, for example, provide the user viewing the toolbar with information as to what media content is represented by each of the selectable options. Alternatively, in some embodiments, a default option from selectable options 430-444 can be selected. For example, the leftmost selectable option (e.g., option 430 with the text label "About") can be selected, where its graphical item (e.g., an icon) is used to represent the selectable option. In another example, the user of the user device can provide a preference setting as to which selectable option is to be the default selection (e.g., always present "All" content). In yet another example, upon receiving affirmative consent from the user of the user device, process 300 can access historical browsing information to determine which selectable option is likely to be selected by the user of the user device and/or which selectable option should be hidden (e.g., as likely to not be selected by the user). Continuing this example, upon loading an application for browsing through content relevant to a particular video game on a mobile device, the application can prompt the user to provide authorization for receiving information from one or more data sources, performing such determinations, and/or recommending one or more actions to the user.

Referring back to FIG. 3, in some embodiments, process 300 can determine that a first selectable option from the multiple selectable options or user interface elements has been selected at 340. This determination can be made using any suitable technique or combination of techniques and can be based on any suitable information. For example, in some embodiments, process 300 can determine if a selectable option in the navigation toolbar has been selected by determining if a particular input has been received by an input device associated with user device 110. As a more particular example, process 300 can determine if a particular area associated with a selectable option in the navigation toolbar has been touched and/or clicked, if a particular button and/or combination of buttons on a remote control device have been selected, and/or if any other suitable input has been received. Additionally or alternatively, process 300 can determine that a selectable option in the toolbar has been selected if a navigational cursor or pointer has been placed over that selectable option.

If, at 340, it is determined that no selectable option has been selected, process 300 can loop back to 330 and continue to present one or more media interfaces in a user interface. For example, an initial user interface, such as the one shown in FIG. 4, can provide a toolbar that includes multiple selectable options for navigating through media content items associated with a particular video game. In response to a particular period of time elapsing and in response to determining that a selectable option has not been selected, a default option from selectable options 430-444 can be selected and its associated media interface or media content items can be presented to the user. In continuing this example, after another particular period of time has elapsed and in response to determining that a selectable option has not been selected, a different option (e.g., an adjacent selectable option) from the navigation toolbar can be selected and its associated media interface or media content items can be presented to the user.

Alternatively, if, at 340, it is determined that a selectable option of the multiple selectable options in the navigation toolbar has been selected, process 300 can modify the navigation toolbar at 350. The modification can be made based on any suitable information and using any suitable technique or combination of techniques. For example, in some embodiments, each of the selectable options in the navigation toolbar can be associated with an animation file that, when executed on a user device, causes a textual item to fade out, slide out, and/or any other suitable technique from the selected option and causes a graphical item to fade in, slide in, and/or any other suitable technique into the selected option, or vice versa. In such an example, each selected option can transition from being identified by a textual item (e.g., a text description having n characters) to a graphical item (e.g., an icon having a fixed pixel width). In a more particular example, as shown in FIGS. 4 and 5, the "About" option 430 has been selected and, in response to determining that option 430 has been selected, process 300 can execute an animation file that causes the textual item "About" to be replaced with graphical icon 510 in FIG. 5.

In some embodiments, a highlight bar 520 or any other suitable user interface elements can be presented to show which option is currently selected.

In some embodiments, when transitioning between a textual item and a graphical item associated with a selectable option, the size of the selected option in the toolbar can be modified. For example, in some embodiments, each graphical item associated with the selectable options in the navigation toolbar can be a given size (e.g., n pixels wide). As such, in response to transforming a selectable option that is identified by a textual item that is n characters long to a graphical item having a fixed pixel width, the selected option can be reduced in size. It should be noted that, in some embodiments, each of the graphical items positioned within the selectable option can occupy a particular pixel width (e.g., the same or similar tab width).

Additionally, if it is determined that a selectable option of the multiple selectable options in the navigation toolbar has been selected, process 300 can present the associated media interfaces corresponding to media content for a particular video game in the category or genre represented by the selected option. As shown in FIGS. 4-6, media interfaces 410 can include a collection of individual media interfaces. Although six media interfaces are shown in FIGS. 4-6, any suitable number of media interfaces, including none, can be presented.

In some embodiments, media interfaces 410 can be presented based on any suitable information and can be presented in response to any suitable action. For example, in some embodiments, media interfaces 410 can be presented based on a search query from a user. As a more particular example, in some embodiments, media interfaces 410 can be selected and/or generated to correspond to one or more media content items which match a search query submitted by a user (e.g., a query for media content items in a particular genre, a query for a particular media content item, and/or any other suitable type of query). As another example, in some embodiments, media interfaces 410 can be presented based on determining a particular web page has been loaded (e.g., a home page corresponding to a provider of the media interfaces, and/or any other suitable web page). In some embodiments, media interfaces 410 can be selected and/or created to correspond to media content items which meet particular criteria. As a more particular example, in some embodiments, the presented media interfaces 410 can represent a group of popular media content items (e.g., the X most popular media content items over a particular time period, and/or any other suitable metric of popularity).

In some embodiments, individual media interfaces within the multiple media interfaces 104 can be associated with any suitable type or types of media content. For example, media interfaces 410 can each be associated with a single video. As another example, media interfaces 410 can each be associated with a playlist which contains multiple videos (or links to videos). As yet another example, media interfaces 410 can be associated with a song and/or any other piece of audio content. As still another example, media interface 410 can be associated with a playlist which contains individual items of audio content. In some embodiments, a playlist can contain a combination of video content, audio content, and/or any other suitable media content (e.g., images, a slideshow of images, etc.). In some embodiments, any suitable number of media content items, and any suitable type of media content items, can be included in a playlist.

In some embodiments, individual media interfaces can include titles that indicate the content of the media content associated with a corresponding media interface. For example, a title can indicate whether the media content associated with the corresponding media interface is a single media content item (e.g., a video) or a playlist (e.g., a collection of videos). As another example, a title can indicate a topic of the media content associated with the corresponding media interface. In some embodiments, a title can include any suitable text, images, icons, graphics, animations, and/or any other suitable content. In some embodiments, a title can be omitted.

In some embodiments, individual media interfaces can include thumbnail images. Thumbnail images can be any suitable image which represents the media content associated with the corresponding media interface. For example, a thumbnail image can be an image which represent the topic of the media content associated with the corresponding media interface. As another example, in some embodiments, a thumbnail image can include a screen capture from a frame of the corresponding media content item. As yet another example, in some embodiments, a thumbnail image can represent the creator of the media content associated with the corresponding media interface (e.g., a logo of an entity, and/or any other suitable representation of the creator of the media content). In some embodiments, a thumbnail image can include any suitable images, icons, graphics, animations, and/or any other suitable content. In some embodiments, a thumbnail image can be omitted.

It should be noted that elements, such as titles, thumbnail images, and/or other media identifier elements, that are presented can be based on one or more items of metadata associated with the media content with which the media identifier element is associated. For example, the media identifier element can include title information based on title metadata of the media content. As another example, the media identifier element can include an image based on thumbnail metadata of the media content and/or a frame of image data from the data of the media content.

Although the individual media interfaces shown in FIGS. 4-6 can include titles, thumbnail images, and/or other media identifier elements, in some embodiments, any other suitable information based on metadata associated with the corresponding media content items can be included. For example, in some embodiments, an individual media interface can indicate the name of the creator of an item of media content represented by the media interface. As another example, in some embodiments, an individual media interface can indicate the number of views an item of media content represented by the media interface has received. As yet another example, in some embodiments, an individual media interface can indicate that a contact (e.g., a friend, an acquaintance, a friend of a friend, and/or any other suitable contact) of a user has watched and/or rated an item of media content represented by the media interface.

Referring back to FIG. 3, in some embodiments, process 300 can continue to determine whether another selectable option from the multiple selectable options or user interface elements has been selected at 360. As described above, this determination can be made using any suitable technique or combination of techniques and can be based on any suitable information. For example, in some embodiments, process 300 can determine if a selectable option in the navigation toolbar has been selected by determining if a particular input has been received by an input device associated with user device 110. As a more particular example, process 300 can determine if a particular area associated with a selectable option in the navigation toolbar has been touched and/or clicked, if a particular button and/or combination of buttons on a remote control device have been selected, and/or if any other suitable input has been received. Additionally or alternatively, process 300 can determine that a selectable option in the toolbar has been selected if a navigational cursor or pointer has been placed over that selectable option. For example, process 300 can determine that a navigational cursor or pointer has moved off of a first selectable option and onto a second selectable option.

If, at 360, it is determined that another selectable option of the multiple selectable options in the navigation toolbar has been selected, process 300 can modify the navigation toolbar at 370. As described herein, the modification can be made based on any suitable information and using any suitable technique or combination of techniques. For example, in some embodiments, each of the selectable options in the navigation toolbar can be associated with an animation file that, when executed on a user device, causes a textual item to fade out, slide out, and/or any other suitable technique from the selected option and causes a graphical item to fade in, slide in, and/or any other suitable technique into the selected option, or vice versa. In such an example, each selected option can transition from being identified by a textual item (e.g., a text description having n characters) to a graphical item (e.g., an icon having a fixed pixel width). In a more particular example, as shown in FIGS. 5 and 6, the "About" option 430 has been de-selected and, in response to determining that option 430 has been de-selected, process 300 can execute an animation file that causes the graphical icon 510 in FIG. 5 to return to the textual item "About" 430 in FIG. 6. Continuing with this example, the "Game Play" option 440 has been selected (e.g., by moving a navigational cursor over option 440) and, in response to determining that option 440 has been selected, process 300 can execute an animation file associated with option 440 that causes the textual item "Game Play" 440 to be replaced with graphical icon 620 in FIG. 6.

Additionally, process 300 can cause media interfaces corresponding to media content relevant to the selected option to be presented to the user for selection.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 512 and/or hardware processor 522) to execute the mechanisms described herein. For instance, these mechanisms can encompass a computer program written in a programming language recognizable by user device 410, and/or server 402 that is executing the mechanisms (e.g., a program written in a programming language, such as, Java, C, Objective-C, C++, C #, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about user actions stored on a user device 110, information about user actions stored on a remote device such as server 102, etc.), or to control whether and/or how to receive messages for promoting content. In addition, certain data can be treated in one or more ways before it is stored or used, so that personal information is removed. For example, a user's identity can be treated so that no personal information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the process of FIG. 3 can be executed or performed in any order or sequence not limited to the order and sequence shown and described in the figures. Also, some of the above steps of the process of FIG. 3 can be executed or performed substantially simultaneously where appropriate or in parallel to reduce latency and processing times. Furthermore, it should be noted that FIG. 3 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for navigating a user interface with a toolbar are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for media guidance, comprising:
   determining that a request to browse through media content items includes a particular type of media content;
   in response to determining that the media content items responsive to the request includes the particular type of media content, causing a toolbar that corresponds to the particular type of media content and that contains a plurality of selectable options to be presented concurrently with the media content items responsive to the request, wherein each of the plurality of selectable options corresponds to a category of media content, wherein each of the plurality of selectable options is associated with a textual item that identifies the category of media content being presented with that selectable option and a corresponding graphical icon that represents the category of media content being presented with that selectable option, and wherein each of the plurality of selectable options is currently presented with the textual item and the corresponding graphical icon is inhibited from being presented;
   determining that a first selectable option from the plurality of selectable options has been selected;
   modifying the toolbar by causing a first animation to be displayed that replaces the textual item associated with the first selectable option with the graphical icon associated with the first selectable option, wherein each of the remaining selectable options of the plurality of selectable options shift to accommodate the graphical icon associated with the first selectable option while continuing to be represented with the corresponding textual item;
   determining that a second selectable option from the plurality of selectable options has been selected; and
   modifying the toolbar by causing a second animation to be displayed that replaces the textual item associated with the second selectable option with the graphical icon associated with the second selectable option and a third animation to be displayed that replaces the graphical icon associated with the first selectable option with the textual item associated with the first selectable option, wherein each of the remaining selectable options of the plurality of selectable options shift to accommodate the textual item associated with the first selectable option and the graphical icon associated with the second selectable option.

2. The method of claim 1, further comprising:
   determining whether to include a selectable option in the toolbar based on availability of the media content items in the category of media content; and
   in response to determining that the selectable option should be included in the toolbar, retrieving the textual item and the graphic item associated with the selectable option prior to presenting the toolbar.

3. The method of claim 1, further comprising:
   receiving user preferences relating to the toolbar; and
   selecting, without user intervention, a selectable option in the toolbar based on the user preferences, wherein the toolbar is modified in response to the selection.

4. The method of claim 1, further comprising:
   receiving user preferences relating to the toolbar; and
   inhibiting a selectable option in the toolbar from being presented based on the user preferences.

5. The method of claim 1, wherein the second animation shows the textual item associated with the second selectable option transforming into the graphical icon associated with the second selectable option, wherein the third animation shows the graphical icon associated with the first selectable option transforming into the textual item associated with the first selectable option, and wherein the second animation and the third animation are presented concurrently.

6. The method of claim 1, wherein the first selectable option that is identified by the textual item has a plurality of characters occupying a first size in the toolbar and wherein the first animation of the first selectable option includes reducing the first selectable option from the first size in the toolbar to a second size that accommodates a pixel width of the graphical icon.

7. The method of claim 6, wherein the second animation of the second selectable option includes reducing the second selectable option from a third size that accommodates the plurality of characters in the textual item of the second selectable option to a fourth size that accommodates the pixel width of the graphical icon corresponding to the second selectable option and wherein, in response to determining that the second selectable option has been reduced, the third animation of the first selectable option includes returning the first selectable option from the second size to the first size.

8. The method of claim 1, further comprising causing a navigation cursor to be presented for navigating the toolbar, wherein, in response to determining that the navigation cursor is navigating away from the first selectable option, the second animation shows the textual item associated with the second selectable option transforming into the graphical icon associated with the second selectable option and the third animation shows the graphical icon associated with the first selectable option transforming into the textual item associated with the first selectable option.

9. A system for media guidance, the system comprising:
   a hardware processor that is configured to:
   determine that a request to browse through media content items includes a particular type of media content;

in response to determining that the media content items responsive to the request includes the particular type of media content, cause a toolbar that corresponds to the particular type of media content and that contains a plurality of selectable options to be presented concurrently with the media content items responsive to the request, wherein each of the plurality of selectable options corresponds to a category of media content, wherein each of the plurality of selectable options is associated with a textual item that identifies the category of media content being presented with that selectable option and a corresponding graphical icon that represents the category of media content being presented with that selectable option, and wherein each of the plurality of selectable options is currently presented with the textual item and the corresponding graphical icon is inhibited from being presented;

determine that a first selectable option from the plurality of selectable options has been selected;

modify the toolbar by causing a first animation to be displayed that replaces the textual item associated with the first selectable option with the graphical icon associated with the first selectable option, wherein each of the remaining selectable options of the plurality of selectable options shift to accommodate the graphical icon associated with the first selectable option while continuing to be represented with the corresponding textual item;

determine that a second selectable option from the plurality of selectable options has been selected; and modify the toolbar by causing a second animation to be displayed that replaces the textual item associated with the second selectable option with the graphical icon associated with the second selectable option and a third animation to be displayed that replaces the graphical icon associated with the first selectable option with the textual item associated with the first selectable option, wherein each of the remaining selectable options of the plurality of selectable options shift to accommodate the textual item associated with the first selectable option and the graphical icon associated with the second selectable option.

10. The system of claim 9, wherein the hardware processor is further configured to:

determine whether to include a selectable option in the toolbar based on availability of the media content items in the category of media content; and in response to determining that the selectable option should be included in the toolbar, retrieve the textual item and the graphic item associated with the selectable option prior to presenting the toolbar.

11. The system of claim 9, wherein the hardware processor is further configured to:

receive user preferences relating to the toolbar; and select, without user intervention, a selectable option in the toolbar based on the user preferences, wherein the toolbar is modified in response to the selection.

12. The system of claim 9, wherein the hardware processor is further configured to:

receive user preferences relating to the toolbar; and inhibit a selectable option in the toolbar from being presented based on the user preferences.

13. The system of claim 9, wherein the second animation shows the textual item associated with the second selectable option transforming into the graphical icon associated with the second selectable option, wherein the third animation shows the graphical icon associated with the first selectable option transforming into the textual item associated with the first selectable option, and wherein the second animation and the third animation are presented concurrently.

14. The system of claim 9, wherein the first selectable option that is identified by the textual item has a plurality of characters occupying a first size in the toolbar and wherein the first animation of the first selectable option includes reducing the first selectable option from the first size in the toolbar to a second size that accommodates a pixel width of the graphical icon.

15. The system of claim 14, wherein the second animation of the second selectable option includes reducing the second selectable option from a third size that accommodates the plurality of characters in the textual item of the second selectable option to a fourth size that accommodates the pixel width of the graphical icon corresponding to the second selectable option and wherein, in response to determining that the second selectable option has been reduced, the third animation of the first selectable option includes returning the first selectable option from the second size to the first size.

16. The system of claim 9, wherein the hardware processor is further configured to cause a navigation cursor to be presented for navigating the toolbar, wherein, in response to determining that the navigation cursor is navigating away from the first selectable option, the second animation shows the textual item associated with the second selectable option transforming into the graphical icon associated with the second selectable option and the third animation shows the graphical icon associated with the first selectable option transforming into the textual item associated with the first selectable option.

17. A non-transitory computer-readable medium containing computer-executable instructions that, when executed by a hardware processor, cause the hardware processor to perform a method for media guidance, the method comprising:

determining that a request to browse through media content items includes a particular type of media content;

in response to determining that the media content items responsive to the request includes the particular type of media content, causing a toolbar that corresponds to the particular type of media content and that contains a plurality of selectable options to be presented concurrently with the media content items responsive to the request, wherein each of the plurality of selectable options corresponds to a category of media content, wherein each of the plurality of selectable options is associated with a textual item that identifies the category of media content being presented with that selectable option and a corresponding graphical icon that represents the category of media content being presented with that selectable option, and wherein each of the plurality of selectable options is currently presented with the textual item and the corresponding graphical icon is inhibited from being presented;

determining that a first selectable option from the plurality of selectable options has been selected;

modifying the toolbar by causing a first animation to be displayed that replaces the textual item associated with the first selectable option with the graphical icon associated with the first selectable option, wherein each of the remaining selectable options of the plurality of selectable options shift to accommodate the graphical icon associated with the first selectable option while continuing to be represented with the corresponding textual item;

determining that a second selectable option from the plurality of selectable options has been selected; and modifying the toolbar by causing a second animation to be displayed that replaces the textual item associated with the second selectable option with the graphical icon associated with the second selectable option and a third animation to be displayed that replaces the graphical icon associated with the first selectable option with the textual item associated with the first selectable option, wherein each of the remaining selectable options of the plurality of selectable options shift to accommodate the textual item associated with the first selectable option and the graphical icon associated with the second selectable option.

* * * * *